United States Patent

[11] 3,591,214

[72] Inventor Harry M. Gallay
4649 Saxon Drive, New Smyrna Beach, Fla. 32069
[21] Appl. No. 4,570
[22] Filed Jan. 21, 1970
[45] Patented July 6, 1971

[54] CONNECTION SYSTEM FOR STEEL BEAMS
6 Claims, 15 Drawing Figs.
[52] U.S. Cl. ............................................. 287/189.36, 52/665
[51] Int. Cl. ............................................. F16b 7/00
[50] Field of Search ............................................. 287/20.92 C, 189.36 F, 189.36 C, 189.36 R, 189.36 H, 54 A, 54 B, 54 C; 52/665

[56] References Cited
UNITED STATES PATENTS
| | | | |
|---|---|---|---|
| 444,579 | 1/1891 | Jackson | 287/20.92 C X |
| 495,783 | 4/1893 | Carallaro | 287/189.36 F |
| 1,795,589 | 3/1931 | Zolla | 287/20.92 C |
| 3,456,405 | 7/1969 | Hida et al. | 52/665 X |

Primary Examiner—Reinaldo P. Machado
Assistant Examiner—Wayne L. Shedd
Attorney—Bertha L. MacGregor ABSTRACT: A connection system for steel beams comprising a pair of fittings, one designed to be fastened to a support beam or column, and the other to a framing beam, each fitting provided with a plurality of parallel grooves on each of its sides extending parallel to and normal to the axis of the framing beam, the grooves of the two sides being staggered relatively to each other, each fitting having a notch in that face which abuts the other fitting, the notches matching to form a hole extending through the abutting fittings, a male and a female tongue plate provided with tongues which enter the grooves of the two fittings when axially aligned with each other, and a fastener which preferably is a stud integral with the male tongue plate extending through the hole formed by the matching notches in the abutting fittings and through a hole in the female tongue plate, and a nut on the free end of the stud for drawing the plates together and connecting the tongue plates and fittings together, to thereby connect the beams to which the fittings have been fastened. The same system can be achieved by providing the tongues on the fittings fastened to the support and framing beams respectively, and the grooves on the male and female plates which connect the fittings together.

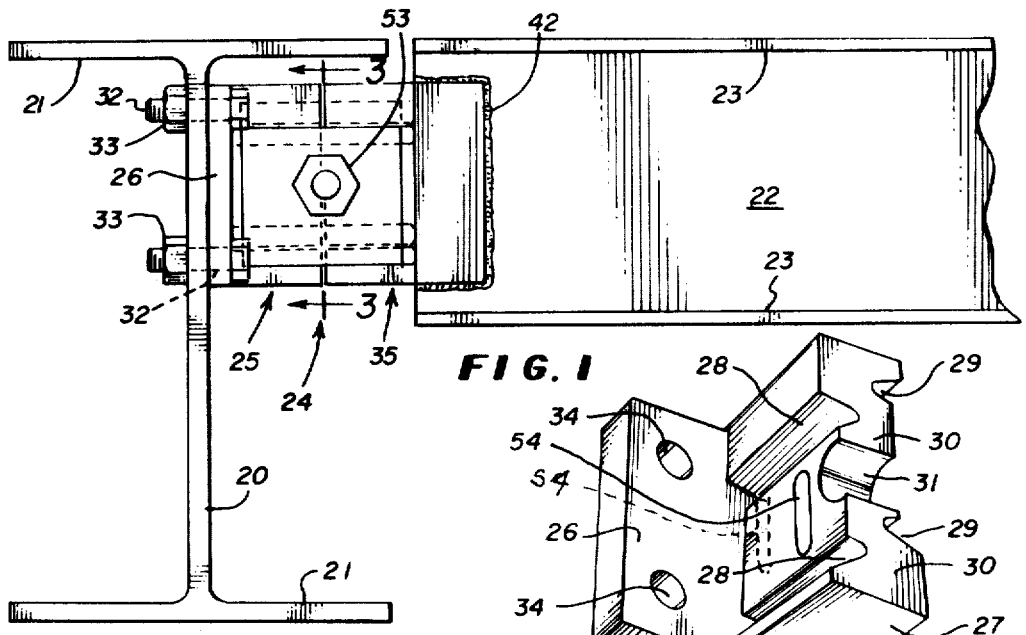

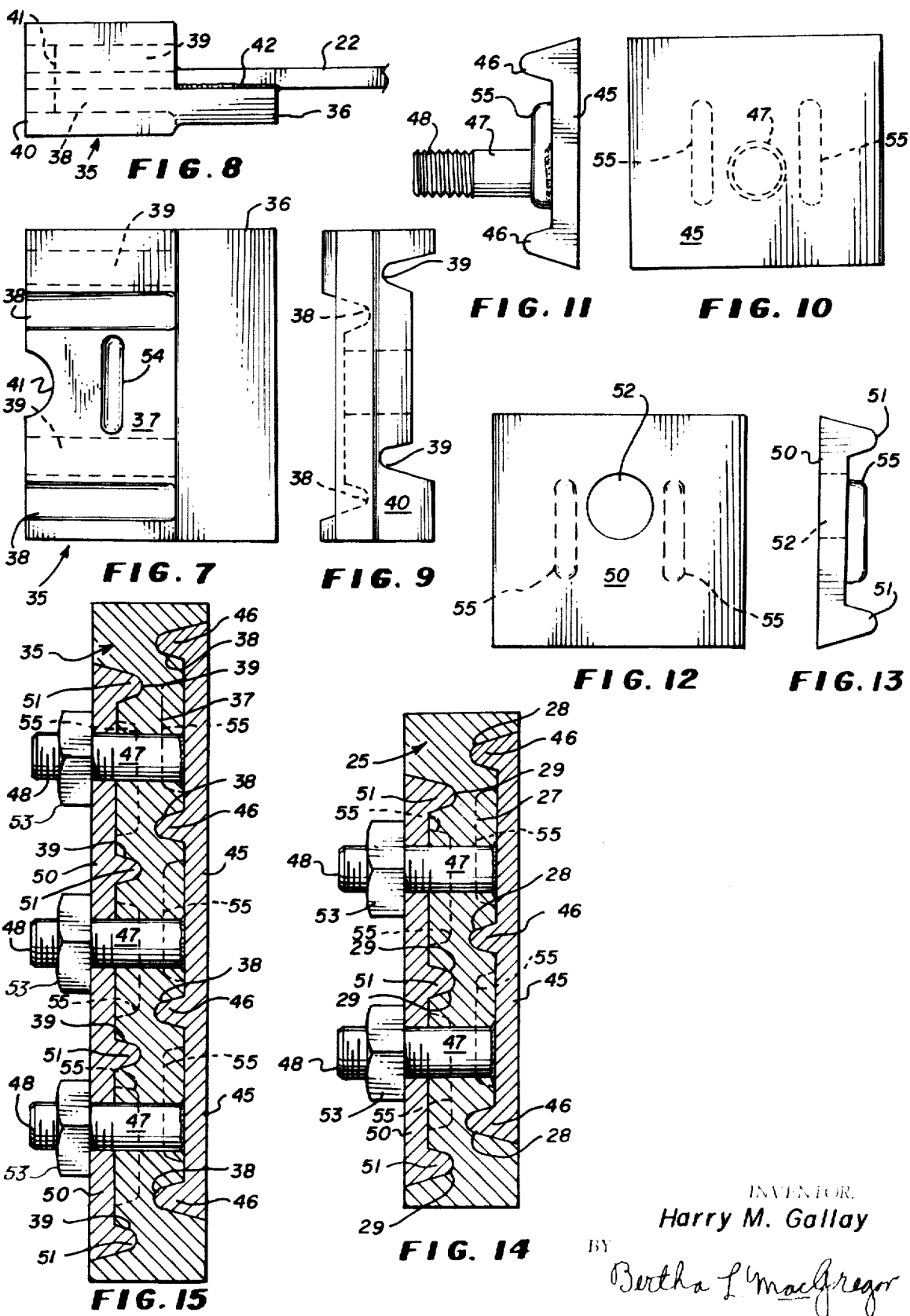

CONNECTION SYSTEM FOR STEEL BEAMS

This invention relates to a connection system for steel beams, more particularly a standardized framing connection which utilizes a minimum number of fasteners in field erection and substantially reduces the amount of labor presently required to erect structural steel.

The connection system embodies a pair of fittings, one designed to be fastened to a supporting beam or column, and the other designed to be fastened to a framing beam, a pair of tongue plates which engage opposite sides of the pair of fittings, and a fastener which preferably is part of one of the tongue plates and extends through matching notches in the faces of abutting surfaces of the two fittings and through a hole in the other tongue plate to connect the parts of the connection system together and thereby connect the supporting beam and framing beam to which the respective fittings have been fastened.

Load is taken by interlocking tongues and grooves rather than by fasteners, thereby permitting the use of a minimum number of fasteners in field erection, whereby labor costs and time required are substantially reduced as compared to present methods of structural steel erection.

The tongues and grooves are taper seating, self-centering, and facilitate ease of installation. The primary tongues and grooves are parallel to the axis of the framing beam and can be made long enough to provide excess shear and bearing load capacity. Thus large variations in the length of the tongue-groove engagement, and in beam plus fitting overall length can be tolerated. Secondary tongues and grooves, orthogonal or normal to the beam axis, with suitable clearances, may also be provided to take axial loads and prevent axial separation.

No hangers or special supports are needed to hold the framing beam in place temporarily during the connection procedure. Installation of one nut only on one stud in each joint, in the field, will engage a pair of tongue plates and hold the plates in engagement with the grooves in the fittings previously fastened to the two beams to be connected. This is sufficient to support the framing beam weight, and can be accomplished with one wrench since torque is resisted by the male tongue plate.

The connection means herein shown and described will accommodate a range of beam sizes up to and including 36 inches wide flange structural steel. The invention is exemplified herein in a system which employs a pair of fittings each provided on opposite sides with two parallel grooves, a pair of tongue plates having tongues which engage the grooves on each side of the fittings, and a single fastener for connecting the parts together. However, the strength and load capacity of the connection system may be widely increased by enlarging the fittings and tongue plates, providing thereon three or four grooves on each side of each fitting and three or four tongues on each of the tongue plates, and utilizing two or three fastener studs, as hereinafter described.

In the drawings:

FIG. 1 is an elevational view of a heavy beam, referred to herein as the support beam, an elevational side view of a lighter beam which serves as a framing beam between two of the support beams, showing in side elevation the connection system for steel beams embodying my invention.

FIG. 2 is a perspective view of the support fitting which is part of the connection system of FIG. 1.

FIG. 3 is a transverse vertical sectional view in the plane of the line 3-3 of FIG. 1.

FIG. 4 is an elevational end view of the support fitting of FIG. 2.

FIG. 5 is an elevational side view of the support fitting of FIG. 2.

FIG. 6 is an elevational view of the face of the support fitting of FIG. 2, which faces a similar fitting referred to herein as a beam fitting.

FIG. 7 is an elevational side view of the beam fitting which faces and cooperates with the support fitting of FIG. 2.

FIG. 8 is an elevational end view of the beam fitting of FIG. 7, showing also the web of the framing beam of FIG. 1.

FIG. 9 is an elevational view of the beam fitting of FIGS. 7 and 8, showing the face which abuts the support fitting of FIG. 2.

FIG. 10 is an elevational view of a male tongue plate which engages one of the grooved sides of the abutting support and beam fittings.

FIG. 11 is an elevational side view of the tongue plate of FIG. 10.

FIG. 12 is an elevational view of a female tongue plate which engages the other of the grooved sides of the abutting support and beam fittings.

FIG. 13 is an elevational side view of the tongue plate of FIG. 12.

FIG. 14 is a transverse vertical sectional view similar to FIG. 3, through the assembled support fitting and the male and female tongue plates fastened thereto, but showing the support fitting and tongue plates enlarged to embody three grooves on each side of the support fitting and three tongues on each of the two tongue plates of the connection system, connected by two fasteners.

FIG. 15 is a view similar to FIG. 14 but showing the beam fitting enlarged to utilize four grooves on each of its sides, and tongue plates with four tongues each, connected by three fasteners.

In the embodiment of the invention shown in the drawings, the heavy or support beam consists of a web 20 and flanges 21. The lighter or framing beam consists of a web 22 and flanges 23. The connection system for steel beams, embodying my invention, is indicated as a whole at 24 in FIG. 1.

The device shown in FIG. 2 is referred to herein as a support fitting, 25 as a whole, comprising a flat plate 26 integral with or rigidly connected to a connector member 27 provided with two parallel axial grooves 28 on one side and two parallel axial grooves 29 on the opposite side, and orthogonal grooves 54 on each side, the grooves of one side being staggered with respect to the grooves on the opposite side. The face 30 of the connector member 27 is provided with a semicircular notch 31. The fitting 25 as a whole may be T-shaped as shown or it may be L-shaped by altering the shape of the plate 26 by which the fitting as a whole is fastened to the web 20 of the support beam. The notch 31 may be angular instead of semicircular. As shown in FIG. 1, the fitting 25 is fastened to the web 20 of the heavy beam by bolts 32 and nuts 33, the bolts extending through the holes 34 in the plate 26. The fitting plate 26 may be welded to the web 20 of the support beam instead of being bolted to it as shown. The grooves 28, 29 are parallel to the axis of the beam 22 and perpendicular to the web 20 of the support beam.

FIGS. 7, 8 and 9 show a fitting, 35 as a whole, referred to herein as a beam fitting, fastened to the web 23 of a framing beam, as shown in FIG. 1. The beam fitting 35 cooperates with the support fitting 25, as hereinafter explained, and resembles the construction of the fitting 25 with some exceptions. The beam fitting 35 comprises a plate 36 integral with or rigidly connected to a connector member 37 provided with two parallel grooves 38 on one side and two parallel grooves 39 on the opposite side, the grooves of one side being staggered with respect to the grooves on the opposite side. The face 40 of the connector member 37 is provided with a semicircular notch 41. The notch 41 may be angular instead of semicircular, but matches the notch 31 in the support fitting 25. As shown in FIG. 1, the beam fitting 35 is fastened to the web 22 of the framing beam by welding 42, but other fastening means may be employed. The grooves 38, 39 are parallel to the axis of the light beam 22 and are axially aligned with the grooves 28, 29, respectively, of the support fitting 25 when the two fittings 25 and 35 are in the positions required for connecting them together.

Male and female tongue plates are used to engage opposite sides of the fittings 25 and 35 which are to be connected together after each has been fastened to the web of a steel beam such as the webs 20 and 22 respectively. FIGS. 10 and 11 illustrate the male tongue plate 45 which is flat on its outer major surface and provided with two tongues 46 on its opposite or inner surface and a stud 47 with a threaded end 48 protruding from the inner surface of the plate 45. FIGS. 12 and 13 illustrate the female tongue plate 50 which is flat on its outer major surface, provided with two tongues 51 on its opposite or inner surface, and a round hole 52 extending through the plate.

The male tongue plate 45 is placed into contact with one side of the connector members 27 and 37 when the latter are positioned with their faces 30 and 40, respectively, abutting, and their grooves 28 and 38 in axial alignment on one side of the fittings and their grooves 29 and 39 in axial alignment on the opposite side of the fittings. Placement of the male plate 45 into contact with one side of the contacting connector members 27 and 37 also places the tongues 46 into the axially aligned grooves 28 and 38 of the two members, with the stud 47 extending through the circular hole formed by the semicircular notches 31 and 41 in the connector members 27 and 37 of the fittings 25 and 35 respectively. The female tongue plate 50 is similarly positioned on the opposite side of the connector members 27 and 37, with the tongues 51 engaging the grooves 29 and 39. The stud 47 then enters the hole 52 of the tongue plate 50. A nut 53 is threaded onto the threaded end 48 of the stud 47 to draw the tongue plates 45 and 50 toward each other and in firm engagement with the cooperating fittings 25 and 35.

To enhance the holding power of the tongue plates 45 and 50 to retain the connector fittings 25 and 35 in abutment the fitting members 27 and 37 may be provided with grooves 54 on opposite sides for reception of ribs 55 on the tongue plates 45 and 50, respectively, said grooves 54 and ribs 55 extending longitudinally at right angles to the tongues 46 (in grooves 28, 38) and tongues 51 (in grooves 29, 39).

FIGS. 14 and 15 are transverse vertical sectional views similar to FIG. 3, showing tongue plates on opposite sides of the facing support and beam fittings, but differing from the structure heretofore described in that three interfitting tongues and grooves are shown in FIG. 14 and four interfitting tongues and grooves are shown in FIG. 15 in place of the two interfitting tongues and grooves of FIG. 3 and other figures of the drawings. The sectional views are similar whether taken in planes like FIG. 3 through the left-hand support fitting 25, or through the right-hand beam fitting 35. Therefore, the parts have been numbered in FIG. 14 as illustrating a transverse vertical section through an enlarged support fitting 25, and numbered in FIG. 15 as illustrating a similar section through an enlarged beam fitting 35.

In FIG. 14 the support fitting 25 has a connector member 27 grooved on one side with three grooves 28 and on the other side with three grooves 29 for reception of the tongues 46 of tongue plate 45 and tongues 51 of tongue plate 50. Two fasteners, namely, two studs 47 with threaded ends 48, on the tongue plate 45 are used to fasten the tongue plates to the support fitting 25 and the beam fitting 35.

In FIG. 15 the beam fitting 35 has a connector member 37 grooves on one side with four grooves 38 and on the other side with four grooves 39 for reception of four tongues 46 of tongue plate 45 and four tongues 51 of tongue plate 50. Three fasteners, namely, three studs 47 with threaded ends 48, on tongue plate 45 are used to fasten the tongue plates to the support fitting 25 and beam fitting 35.

In field erection, each end of the framing beam 22—23, to which have previously been fastened fittings 35, is positioned relatively to the support beams 20—21, to which have previously been fastened fittings 25, so that fittings 35 and 25 butt, their semicircular notches or half holes 31 and 41 joining to provide a hole for stud 47 protrusion. The half holes also could be slots. The male tongue plate 45 is installed so that its tongues 46 engage the grooves 28 and 38, axially aligned, on the abutting fittings 25 and 35, and its stud 47 protrudes through the hole provided by matching notches 31, 41. Next the female tongue plate 50 is installed by engaging its tongues 51 with the grooves 29 and 39, axially aligned, on the opposite side of the fittings 25 and 35, with the stud 47 protruding through the hole 52 in tongue plate 50. The nut 53 is then applied to the threaded end 48 of stud 47 and tightened to retain both tongue plates, torque being resisted by tongues 46 and 51 engaging grooves in fittings 25 and 35. If the ribs 55 and grooves 54 are employed, they aid in resisting torque, due to their positions at right angles to the grooves 28, 29, 38 and 39 and cooperating tongues therein.

It is also possible to achieve the same system by reversing the locations of tongue and grooves. Tongues 51, 46 and 55 could be incorporated in fittings 35 and 25, and grooves 28, 29, 38, 39, and 54 in male and female plates 45 and 50. However, the arrangements shown are preferred.

I claim:
1. A connection system for steel beams comprising
   a. a pair of abutting fittings, one designed to be fastened to a support beam or column and the other to a framing beam, each fitting being provided with a plurality of parallel grooves on each of its sides, and each fitting having a notch in that face which abuts the other fitting, said notches matching to form a hole extending through the abutting fittings,
   b. a female tongue plate provided with parallel tongues which enter the grooves on one side of the two fittings when axially aligned with each other in abutting relationship, and having a hole extending through the plate,
   c. a male tongue plate provided with parallel tongues which enter the grooves on the side of the two fittings opposite the female tongue plate when the grooves of the two fittings are axially aligned with each other, and having a stud projecting from the plate for extending through the hole formed by the matching notches in the fittings and the hole in the female plate, and
   d. a nut on the free end of the stud drawing the tongue plates toward each other and connecting the plates fittings together to thereby connect the support and framing beams to which the fittings are fastened.

2. The connection system defined by claim 1, in which the grooves of the two sides of each fitting are staggered relatively to each other.

3. The connection system for steel beams defined by claim 1, in which the grooves on each side of the abutting fittings extend parallel to the axis of the framing beam.

4. The connection system for steel beams defined by claim 1, in which the notches on abutting faces of the fittings are semicircular in shape to form a round hole extending through the fittings and axially at right angles to the grooves in the fittings, and the said stud has a round shank.

5. The connection system for steel beams defined by claim 3, in which the fittings are provided with additional grooves on opposite sides which extend at right angles to the grooves which are parallel to the axis of the framing beam, and the tongue plates include ribs for seating in said additional grooves.

6. The connection system for steel beams defined by claim 1, in which one of the fittings is provided with an attachment plate parallel to the abutting face of the fitting for attachment to a support beam, and the other of the fittings is provided with an attachment plate parallel to the web of a framing beam for attachment to said framing plate.